US010344628B2

(12) United States Patent
Kubo et al.

(10) Patent No.: US 10,344,628 B2
(45) Date of Patent: Jul. 9, 2019

(54) COMPRESSED AIR ENERGY STORAGE POWER GENERATION DEVICE

(71) Applicant: Kobe Steel, Ltd., Hyogo (JP)

(72) Inventors: Yohei Kubo, Kobe (JP); Masatake Toshima, Kobe (JP); Masaki Matsukuma, Hyogo (JP); Hiroki Saruta, Takasago (JP); Kanami Sakamoto, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 107 days.

(21) Appl. No.: 15/572,441

(22) PCT Filed: Apr. 22, 2016

(86) PCT No.: PCT/JP2016/062823
§ 371 (c)(1),
(2) Date: Nov. 7, 2017

(87) PCT Pub. No.: WO2016/181798
PCT Pub. Date: Nov. 17, 2016

(65) Prior Publication Data
US 2018/0171832 A1 Jun. 21, 2018

(30) Foreign Application Priority Data
May 11, 2015 (JP) .................................. 2015-096773

(51) Int. Cl.
*F01K 27/02* (2006.01)
*F01K 27/00* (2006.01)
(Continued)

(52) U.S. Cl.
CPC .............. *F01K 27/02* (2013.01); *F01D 15/10* (2013.01); *F01K 3/12* (2013.01); *F01K 27/00* (2013.01);
(Continued)

(58) Field of Classification Search
CPC .... F01K 27/02; F02C 1/05; F02C 6/16; F01D 15/10; F28D 20/0034; H02K 7/14
See application file for complete search history.

(56) References Cited

U.S. PATENT DOCUMENTS

2010/0251712 A1* 10/2010 Nakhamkin .............. F01K 3/12
60/659
2011/0094231 A1 4/2011 Freund
(Continued)

FOREIGN PATENT DOCUMENTS

CN 102953823 A 3/2013
CN 103452612 B 1/2015
(Continued)

OTHER PUBLICATIONS

The extended European search report issued by the European Patent Office dated Nov. 27, 2018, which corresponds to European Patent Application No. 16792523.9-1008 and is related to U.S. Appl. No. 15/572,441.
(Continued)

*Primary Examiner* — Mark A Laurenzi
*Assistant Examiner* — Shafiq Mian
(74) *Attorney, Agent, or Firm* — Studebaker & Brackett PC

(57) ABSTRACT

A compressed air energy storage power generation device 2 includes a compressor, a pressure accumulator tank, and an expander. The compressor compresses air by being driven with renewable energy. The pressure accumulator tank stores the air compressed by the compressor. The expander is driven by the compressed air. A power generator is mechanically connected to the expander and generates electric power, which is to be supplied to a demander. The compressed air energy storage power generation device includes: first heat exchanges for recovering compression heat; temperature sensors that measure the temperatures of
(Continued)

the heat media having the temperature increased by the first heat exchangers; high-temperature heat medium tanks, each of which individually stores the heat medium depending on the temperature thereof; second heat exchangers for heating compressed air; a low-temperature heat medium tank that stores the heat medium having the temperature decreased in the second heat exchanger; and a control unit that switches high-temperature heat storage switching valves to thereby supply the heat medium from the first heat exchangers to either of the high-temperature heat medium tanks.

9 Claims, 10 Drawing Sheets

(51) Int. Cl.
| | |
|---|---|
| *F02C 1/05* | (2006.01) |
| *F02C 6/16* | (2006.01) |
| *F28D 20/00* | (2006.01) |
| *H02J 15/00* | (2006.01) |
| *F01D 15/10* | (2006.01) |
| *H02K 7/14* | (2006.01) |
| *H02K 51/00* | (2006.01) |
| *F01K 3/12* | (2006.01) |
| *F02C 1/04* | (2006.01) |

(52) U.S. Cl.
CPC ................. *F02C 1/04* (2013.01); *F02C 1/05* (2013.01); *F02C 6/16* (2013.01); *F28D 20/00* (2013.01); *F28D 20/0034* (2013.01); *H02J 15/00* (2013.01); *H02K 7/14* (2013.01); *H02K 51/00* (2013.01); *F05D 2220/60* (2013.01); *F05D 2220/76* (2013.01); *F05D 2260/213* (2013.01); *F05D 2260/42* (2013.01); *F28D 2020/0069* (2013.01); *F28D 2020/0082* (2013.01); *Y02E 60/142* (2013.01); *Y02E 60/15* (2013.01)

(56) References Cited

U.S. PATENT DOCUMENTS

| | | | |
|---|---|---|---|
| 2011/0100010 | A1 | 5/2011 | Freund et al. |
| 2011/0146940 | A1* | 6/2011 | Golbs ................. F24D 17/0015 165/10 |
| 2013/0061591 | A1 | 3/2013 | Bove et al. |

FOREIGN PATENT DOCUMENTS

| | | |
|---|---|---|
| DE | 88 01 767 U1 | 8/1988 |
| JP | 2013-509528 A | 3/2013 |
| JP | 2013-509530 A | 3/2013 |
| WO | 92/22741 A1 | 12/1992 |

OTHER PUBLICATIONS

International Search Report issued in PCT/JP2016/062823; dated Jul. 12, 2016.

* cited by examiner

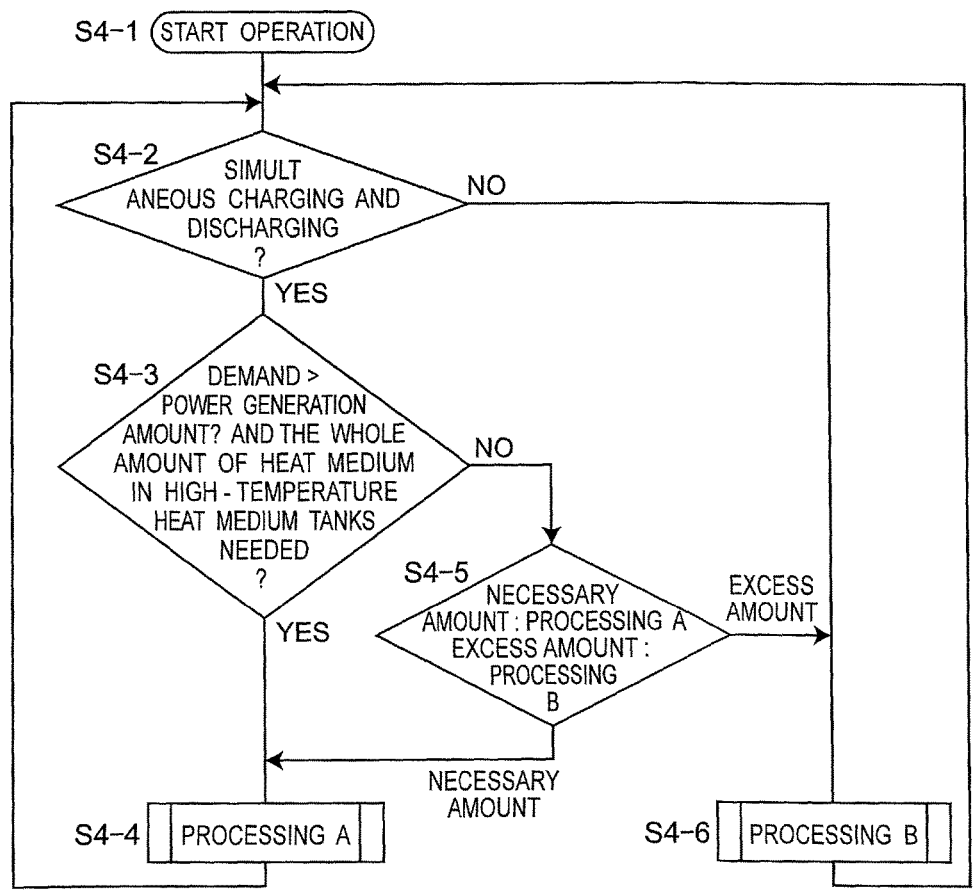

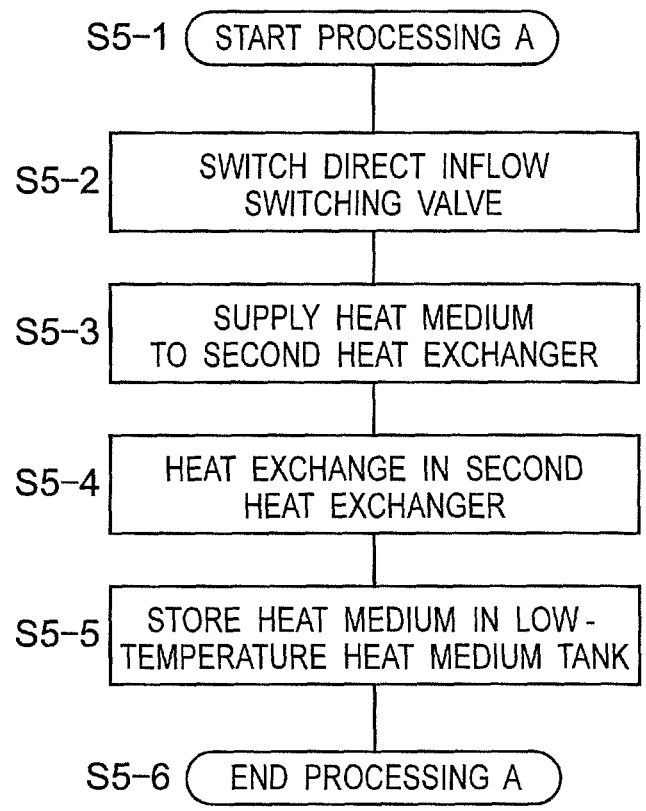

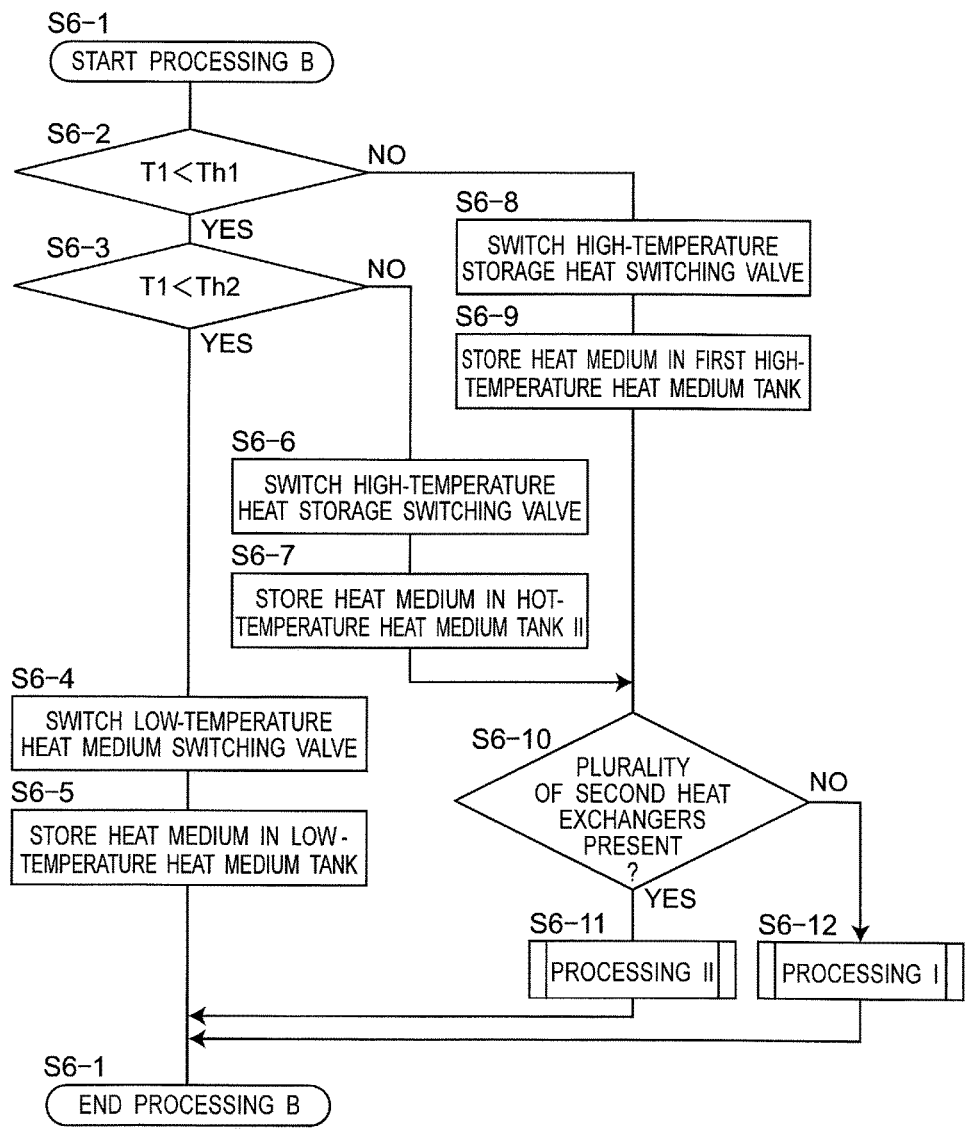

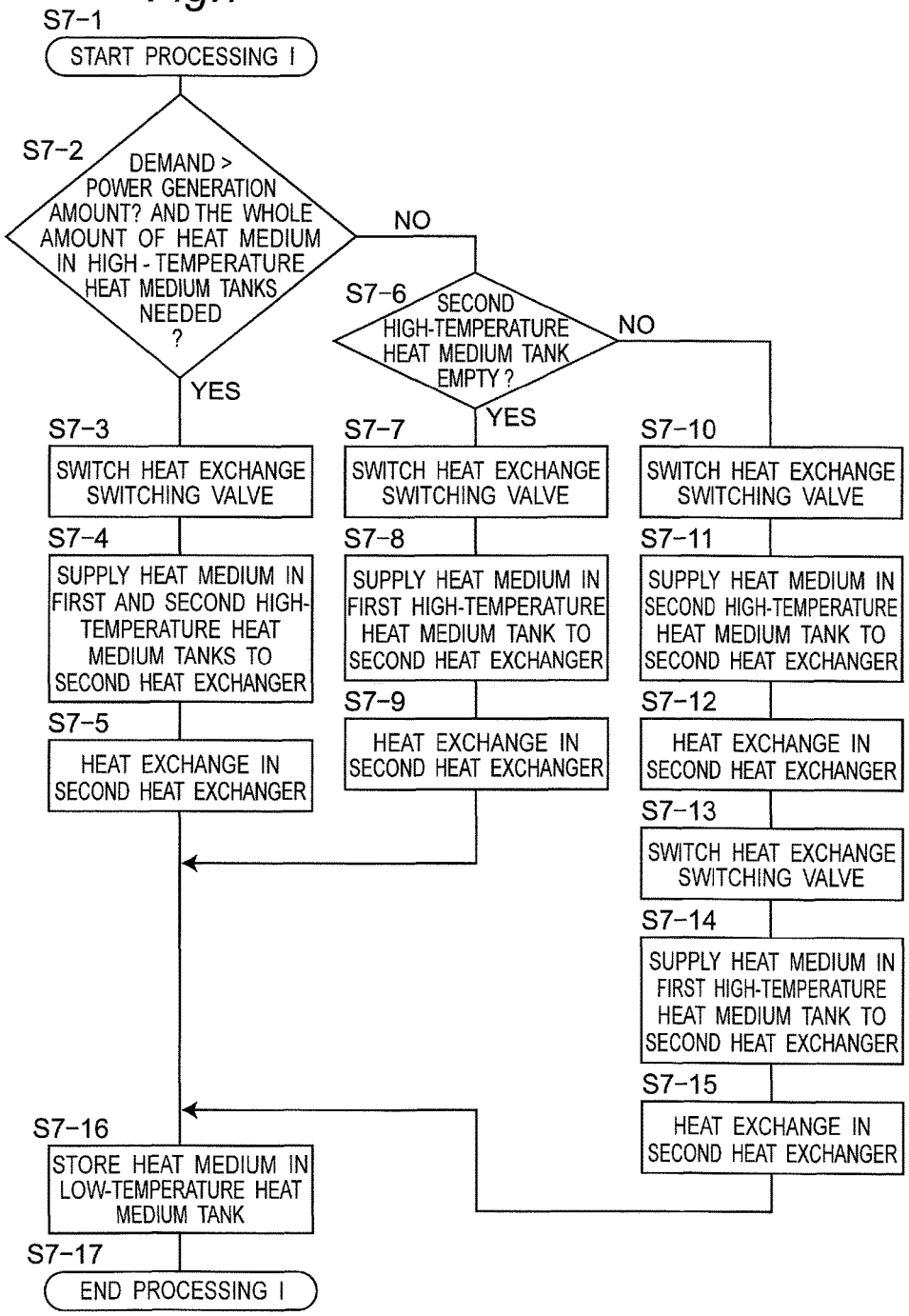

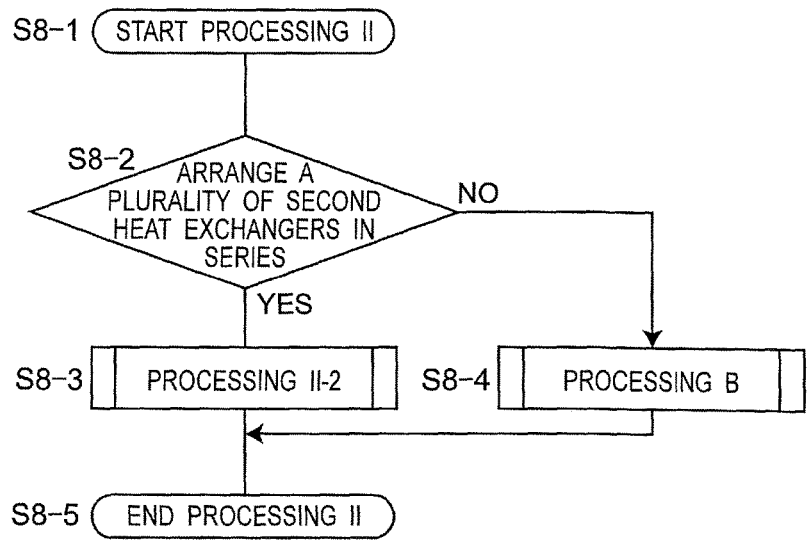
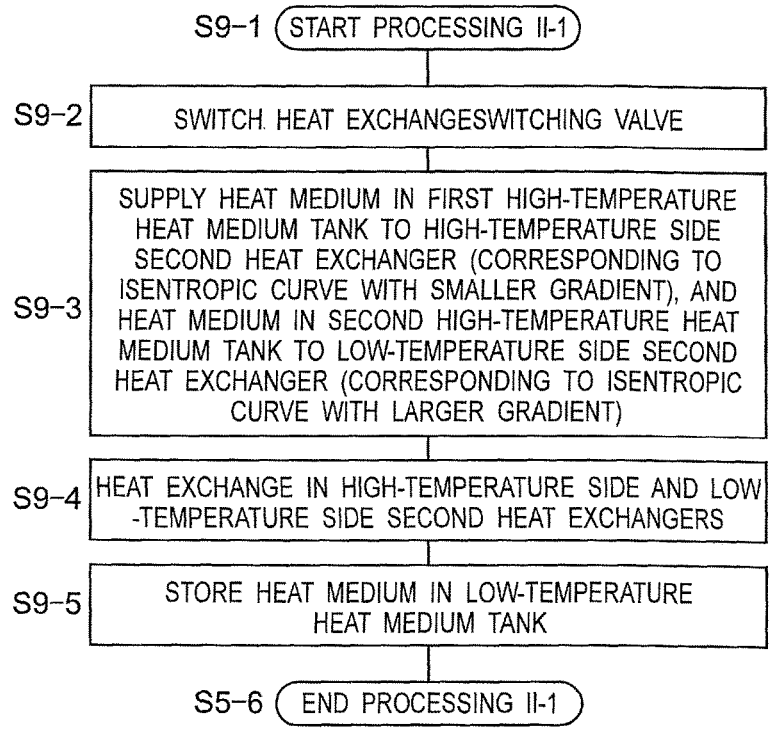

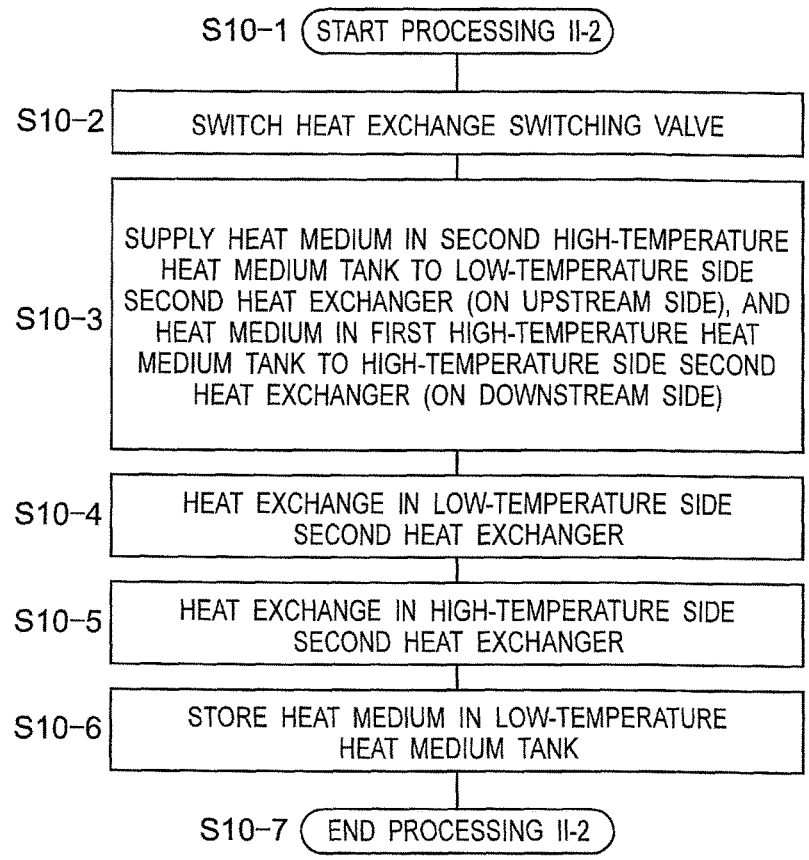

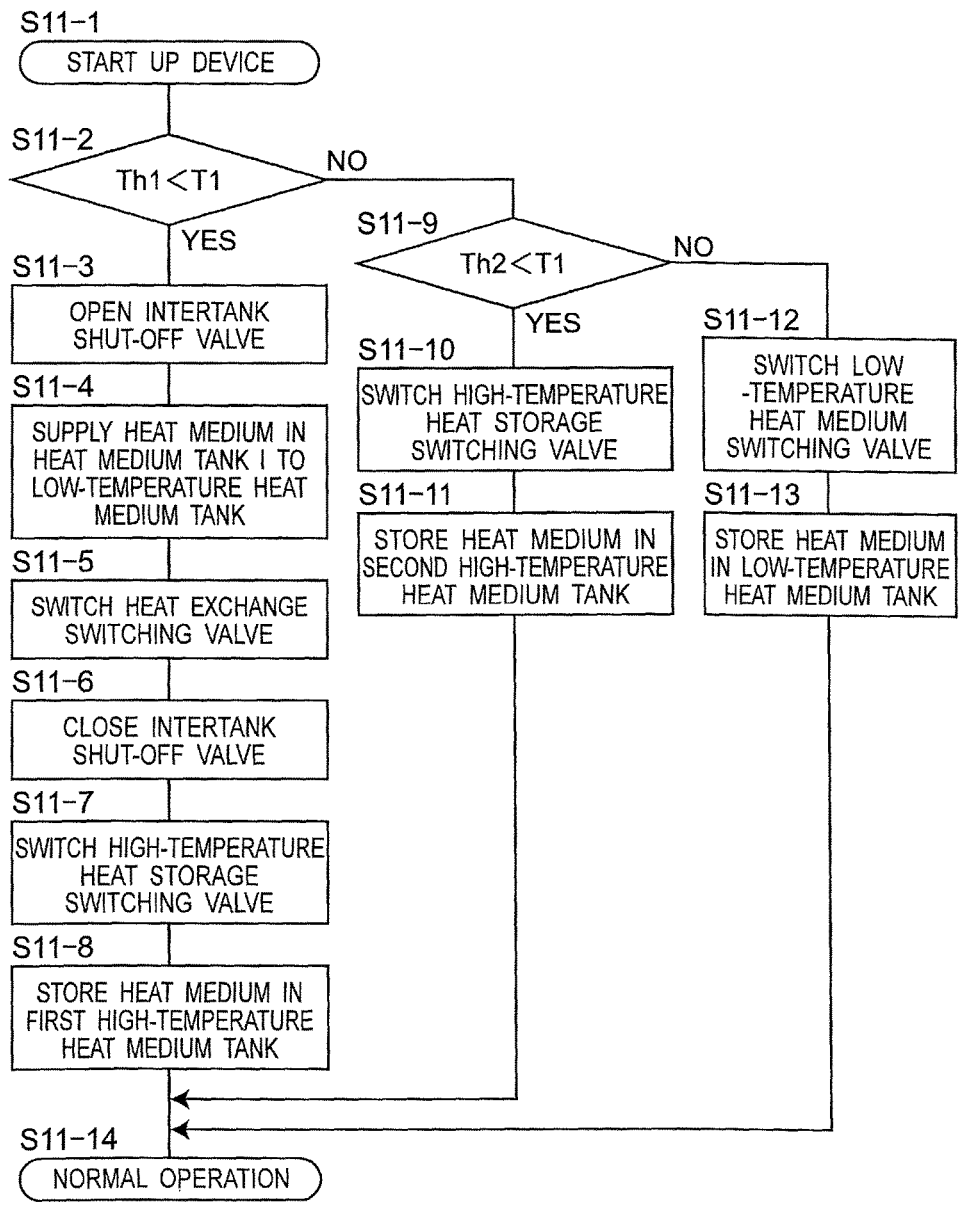

COMPRESSED AIR ENERGY STORAGE POWER GENERATION DEVICE

CROSS-REFERENCE TO RELATED APPLICATION

This is a national phase application in the United States of International Patent Application No. PCT/JP2016/062823 with an international filling date Apr. 22, 2016, which claims priority of Japanese Patent Application No. 2015-096773 filed on May 11, 2015 the contents of which are incorporated herein by reference.

TECHNICAL FIELD

The present invention relates to a compressed air energy storage power generation device.

BACKGROUND ART

Electric power generation that utilizes renewable energy, such as wind power generation and solar power generation, depends on weather conditions and thus does not produce stable outputs in some cases. Thus, outputs need to be leveled out by using an energy storage system, such as a Compressed Air Energy Storage (CAES) power generation system.

Conventional compressed air energy storage power generation devices are generally designed to store electrical energy in a pressure accumulator tank in the form of compressed air during off-peak periods for power plants and to drive an expander by utilizing the compressed air during higher power demand periods to operate a power generator, thereby generating electrical energy.

JP 2013-509530 A discloses such a CAES power generation device. The CAES power generation device disclosed in Patent Document 1 has heat medium tank separated from other components in order to decrease the temperature of a heat medium.

SUMMARY OF THE INVENTION

Problems to be Solved by the Invention

However, JP 2013-509530A fails to mention that the CAES power generation device is provided with a plurality of heat medium tanks, and thus does not also consider that the heat medium is maintained at a high temperature by the plurality of heat medium tanks.

It is an object of the present invention to provide a compressed air energy storage power generation device that can prevent a high-temperature heat medium from mixing with a low-temperature heat medium by employing a plurality of high-temperature heat medium tanks.

Means for Solving the Problems

The present invention provides a compressed air energy storage power generation device, comprising: an electric motor driven with input electric power generated by using renewable energy; a compressor mechanically connected to the electric motor and configured to compress air; a pressure accumulator tank fluidically connected to the compressor and configured to store therein the compressed air by the compressor; an expander fluidically connected to the pressure accumulator tank and driven by the compressed air supplied from the pressure accumulator tank; a power generator mechanically connected to the expander and configured to generate electric power, which is to be supplied to a demander; a first heat exchanger that exchanges heat between the air compressed by the compressor and a heat medium to thereby heat the heat medium; a temperature sensor that measures a temperature of the heat medium, heat-exchanged in the first heat exchanger; a plurality of high-temperature heat medium tanks fluidically connected to the first heat exchanger, the plurality of high-temperature heat medium tanks being configured to individually store the heat medium having the temperature thereof increased by the heat exchange in the first heat exchanger, depending on the temperature of the heat medium; a high-temperature heat storage switching valve for switching the heat medium supplied from the first heat exchanger to any one of the plurality of high-temperature heat medium tanks; a second heat exchanger fluidically connected to the plurality of high-temperature heat medium tanks, the second heat exchanger being configured to exchange heat between the heat medium supplied from each of the plurality of high-temperature heat medium tanks and the compressed air supplied to the expander to thereby heat the compressed air; a low-temperature heat medium tank fluidically connected to the first heat exchanger and the second heat exchanger, the low-temperature heat medium tank being configured to store the heat medium having the temperature thereof decreased by the heat exchange in the second heat exchanger; and a control unit electrically connected to the temperature sensor and the high-temperature heat storage switching valve, the control unit being configured to switch the high-temperature heat storage switching valve to supply the heat medium from the first heat exchanger to any one of the plurality of high-temperature heat medium tanks, in order to individually store the heat medium in the corresponding high-temperature heat medium tank based on a temperature of the heat medium measured by the temperature sensor, depending on the temperature thereof.

With this structure, the compressed air energy storage power generation device includes the plurality of high-temperature heat medium tanks, thereby making it possible to prevent the high-temperature heat medium from mixing with the low-temperature heat medium. Specifically, the high-temperature heat storage switching valve is switched based on the temperature of the heat medium having the temperature thereof increased in the first heat exchanger. Because of this, the heat media are individually stored in the plurality of high-temperature heat medium tanks depending on their temperatures, so that the temperature of the heat medium stored in each high-temperature heat medium tank can be maintained.

Preferably, the first heat exchanger is fluidically connected to the high-temperature heat medium tanks and the second heat exchanger. The compressed air energy storage power generation device further comprises a direct inflow switching valve electrically connected to the control unit, the direct inflow switching valve being configured to switch the heat medium supplied from the first heat exchanger to either the high-temperature heat medium tank or the second heat exchanger. The control unit directly supplies the heat medium from the first heat exchanger to the second heat exchanger by switching the direct inflow switching valve when simultaneously performing compression by the compressor and expansion by the expander.

Thus, the heat medium can be directly supplied from the first heat exchanger to the second heat exchanger without involvement of any high-temperature heat medium tank, thereby making it possible to prevent the loss of heat energy due to a decrease in the temperature of the heat medium while the heat medium is stored in the high-temperature heat medium tank. In particular, such direct supply of the heat medium is effective because, when variations in the renewable energy in the short-term cycle of less than approximately one hour are intended to be leveled out, the compressor and the expander are simultaneously driven in many cases, and in these cases the usage standby time of the heat medium is short or zero. Further, the switching of the direct inflow switching valve can supply the heat medium from the first heat exchanger directly to the second heat exchanger. Because of this, a device which is of the same type as a conventional device can be used, which eliminates the need for significant modification of the device, thereby making it possible to prevent a cost increase and an increase in size of the device. The term "direct" as used herein means the supply of the heat medium from the first heat exchanger to the second heat exchanger without involvement of the high-temperature heat medium tank.

Preferably, the second heat exchanger is one of a plurality of second heat exchangers in the compressed air energy storage power generation device, the plurality of second heat exchangers being fluidically connected in series with respect to the expander. The compressed air energy storage power generation device further comprises a heat exchange switching valve for switching the heat medium supplied from the high-temperature heat medium tank to any one of the second heat exchangers. The control unit switches the heat exchange switching valve to supply each of the heat media, individually stored in the respective high-temperature heat medium tanks depending on the temperature of the heat medium, to each of the second heat exchangers from an upstream side in ascending order of the temperature of the heat medium.

With this structure, through the second heat exchangers, the compressed air exchanges heat with the low-temperature heat medium and the high-temperature heat medium in this order, so that the temperature of the compressed air can be increased in sequence without being decreased. Thus, the heat medium at a high temperature can be effectively utilized.

Preferably, the compressed air energy storage power generation device further comprises a heat exchange switching valve for switching the heat medium supplied from the high-temperature heat medium tank to any one of the second heat exchangers. The expander comprises a first-stage expander main body and a second-stage expander main body. The control unit switches the heat exchange switching valve to supply a higher-temperature heat medium among the heat media, individually stored in the respective high-temperature heat medium tanks depending on the temperature of the heat medium, to the second heat exchanger fluidically connected to one of the first-stage expander main body and the second-stage expander main body that corresponds to an isentropic curve with a smaller gradient in a p-h diagram.

With this structure, the high-temperature heat medium is supplied to the second heat exchanger which is installed for one of the first-stage expander main body and the second-stage expander main body, corresponding to the isentropic curve with the smaller gradient, so that the power generation can be efficiently performed. This is because the expander main body corresponding to the isentropic curve with the smaller gradient undergoes a significant decrease in the enthalpy relative to the same decrease in the pressure, and thus more heat energy needs to be supplied to such an expander main body.

Preferably, the compressed air energy storage power generation device further comprises a low-temperature heat medium switching valve configured to switch the heat medium supplied from the first heat exchanger to either the high-temperature heat medium tank or the low-temperature heat medium tank. The control unit is electrically connected to the temperature sensor and the low-temperature heat medium switching valve, the control unit being configured to switch the low-temperature heat medium switching valve to supply the heat medium to the low-temperature heat medium tank when a temperature of the heat medium with compression heat recovered therein in the first heat exchanger, measured by the temperature sensor, is equal to or lower than a predetermined temperature.

With this structure, the use of the low-temperature heat medium switching valve prevents the mixing of the high-temperature heat medium and the low-temperature heat medium. Specifically, the heat medium supplied from the first heat exchanger to the high-temperature heat medium tank never decreases the temperature of the heat media having the heat stored in the high-temperature heat medium tank, thereby making it possible to prevent the loss of the heat energy.

The present invention also provides a compressed air energy storage power generation device, comprising: an electric motor driven with input electric power generated by using renewable energy; a compressor mechanically connected to the electric motor and configured to compress air; a pressure accumulator tank fluidically connected to the compressor and configured to store therein the compressed air by the compressor; an expander fluidically connected to the pressure accumulator tank and driven by the compressed air supplied from the pressure accumulator tank; a power generator mechanically connected to the expander and configured to generate electric power, which is to be supplied to a demander; a first heat exchanger that exchanges heat between the air compressed by the compressor and a heat medium to thereby heat the heat medium; a temperature sensor that measures a temperature of the heat medium, heat-exchanged in the first heat exchanger; a high-temperature heat medium tank fluidically connected to the first heat exchanger and adapted to store the heat medium having a temperature thereof increased in the first heat exchanger; a second heat exchanger fluidically connected to the high-temperature heat medium tank, the second heat exchanger being configured to exchange heat between the heat medium supplied from the high-temperature heat medium tank and the compressed air supplied to the expander to thereby heat the compressed air; a low-temperature heat medium tank fluidically connected to the first heat exchanger and the second heat exchanger, the low-temperature heat medium tank being configured to store the heat medium having the temperature thereof decreased in the second heat exchanger; a low-temperature heat medium switching valve configured to switch the heat medium supplied from the first heat exchanger, to either the high-temperature heat medium tank or the low-temperature heat medium tank; and a control unit electrically connected to the temperature sensor and the low-temperature heat medium switching valve, the control unit being configured to switch the low-temperature heat medium switching valve to supply the heat medium to the low-temperature heat medium tank when a temperature of the heat medium with compression heat recovered therein in the first heat exchanger, measured by the temperature sensor, is equal to or lower than a predetermined temperature.

According to the present invention, the compressed air energy storage power generation device includes the plurality of high-temperature heat medium tanks and thus can prevent a high-temperature heat medium from mixing with a low-temperature heat medium.

BRIEF DESCRIPTION OF THE DRAWINGS

FIG. 4 is a flowchart showing an entire control method of the compressed air energy storage (CAES) power generation device according to the embodiment of the present invention;

FIG. 5 is a flowchart showing processing A shown in FIG. 4;

FIG. 6 is a flowchart showing processing B shown in FIG. 4;

FIG. 7 is a flowchart showing processing I shown in FIG. 6;

FIG. 8 is a flowchart showing processing II shown in FIG. 6;

FIG. 9 is a flowchart showing processing II-1 shown in FIG. 8;

FIG. 10 is a flowchart showing processing II-2 shown in FIG. 8; and

FIG. 11 is a flowchart showing a control method at start-up of the compressed air energy storage (CAES) power generation device according to the embodiment of the present invention.

MODE FOR CARRYING OUT THE INVENTION

Embodiments of the present invention will be described below with reference to the accompanying drawings.

Figure 1:
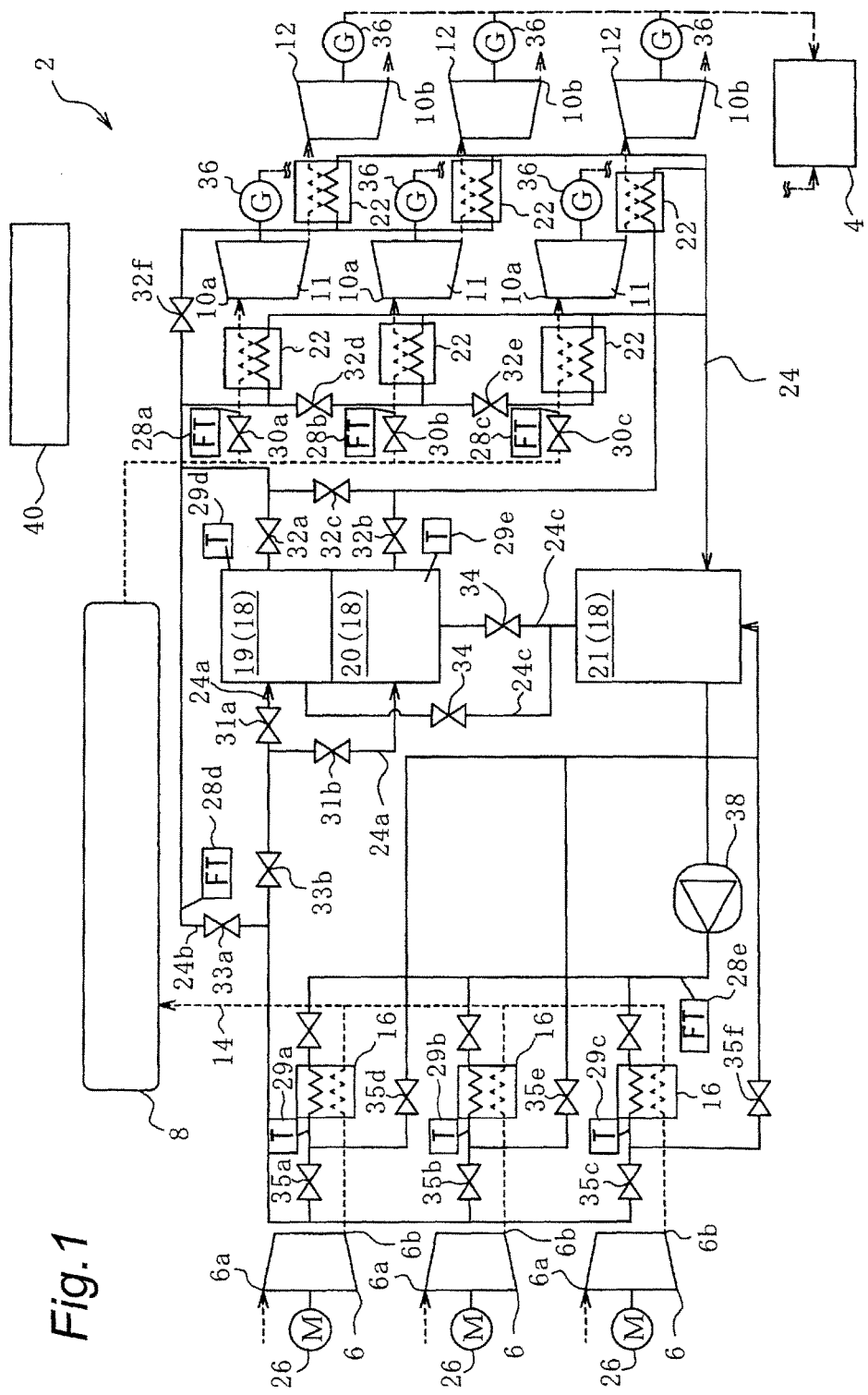
FIG. 1 is a schematic block diagram of a compressed air energy storage (CAES) power generation device according to an embodiment of the present invention.

FIG. 1 illustrates a schematic block diagram of a compressed air energy storage (CAES) power generation device 2. When generating electric power by using renewable energy, the CAES power generation device 2 outputs the electric power, depending on variations in demand power for an electric power system 4 as a demander, while leveling out variations in the output to the electric power system 4.

Referring to FIGS. 1 and 2, the structure of the CAES power generation device 2 will be described below.

The CAES power generation device 2 includes an air path and a heat medium path. In the air path, mainly, compressors 6, a pressure accumulator tank 8, and expanders 10 are provided and connected together fluidically by air pipes 14. Through the inside of the air pipes, air flows (see the dashed line in FIG. 1). In the heat medium path, mainly, first heat exchangers 16, heat medium tanks 18, and second heat exchangers 22 are provided and connected together fluidically by heat-medium pipes 24. Through the inside of the heat-medium pipes, the heat medium flows (see the solid line in FIG. 1).

First, the air path will be described with reference to FIG. 1. In the air path, the drawn air is compressed by the plurality of compressors 6 and stored in the pressure accumulator tank 8. The compressed air stored in the pressure accumulator tank 8 is supplied to the plurality of expanders 10 and used for power generation in power generators 36.

The individual compressors 6 include motors (electric motors) 26. The respective motors 26 are mechanically connected to the compressors 6 and electrically connected in parallel with one another. Electric power generated by the renewable energy is supplied to the motors 26, so that the motors 26 are driven with the electric power, and thereby the compressors 6 are operated. Discharge ports 6b of the compressors 6 are connected fluidically to the pressure accumulator tank 8 through the air pipes 14. Each compressor 6 draws air from a suction port 6a thereinto when driven by the motor 26, compresses the air, and then discharges the compressed air from the discharge port 6b. Consequently, the compressors 6 pressure-feed the compressed air to the pressure accumulator tank 8. The plurality of compressors 6 are connected fluidically in parallel with one another, and in the present embodiment, the number of compressors is three. Note that the number of compressors 6 is not limited thereto and only needs to be one or more.

The pressure accumulator tank 8 stores the compressed air, pressure-fed from the compressors 6. Thus, the pressure accumulator tank 8 can store energy in the form of the compressed air. The pressure accumulator tank 8 is connected fluidically to the expanders 10 through the air pipes 14. Thus, the compressed air stored in the pressure accumulator tank 8 is supplied to the expanders 10. The plurality of air pipes 14 that extend from the pressure accumulator tank 8 to the individual expanders 10 is provided with flow rate sensors 28a to 28c and switching valves 30a to 30c, respectively. Because of this, the volume of air supplied to the expanders 10 is measured, and the switching valves 30a to 30c are opened and closed as appropriate, thereby making it possible to allow or block the supply of the compressed air to the expanders 10.

Each expander 10 is of a two-stage type and includes a first-stage expander main body 11 and a second-stage expander main body 12. Hereinafter, a combination of the first-stage expander main body 11 and the second-stage expander main body 12 may be simply referred to as an "expander 10" in some cases. Both the first-stage expander main body 11 and the second-stage expander main body 12 are provided with the respective power generators 36. The plurality of power generators 36 is mechanically connected to the respective expanders 10. Concurrently, the power generators 36 are electrically connected in parallel with one another. The expanders 10, to which the compressed air is supplied from suction ports 10a, are operated by the supplied compressed air to drive the power generators 36. Each power generator 36 is electrically connected to the external electric power system 4 (see the alternate long and short dash line in FIG. 1). The generated electric power is supplied to the electric power system 4 as the demander. The air expanded by the expanders 10 is discharged from discharge ports 10b to the outside. The plurality of expanders 10 is connected fluidically in parallel to one another, and in the present embodiment, the number of expanders is three. Note that the number of expanders 10 is not limited thereto and only needs to be one or more.

Next, the heat medium path will be described with reference to FIG. 1. In the heat medium path, heat generated in the compressors 6 is recovered in the heat medium by the first heat exchangers 16. Subsequently, the heat medium having heat recovered therein is stored in the heat medium tanks 18 (a first high-temperature heat medium tank 19 and a second high-temperature heat medium tank 20), and then the heat is returned to the compressed air in the second heat exchangers 22, before the compressed air is expanded by the expanders 10. The heat medium having its temperature decreased in the second heat exchangers 22 is supplied to the heat medium tank 18 (the low-temperature heat medium tank 21). Then, the heat medium is supplied from the low-temperature heat medium tank 21 to the first heat exchangers 16 again. In this way, the heat medium is circulated. Here, the kind of the heat medium is not particularly limited and may be, for example, water, oil, etc.

Each of the first heat exchangers 16 is provided in the air pipe 14 between the corresponding compressor 6 and the pressure accumulator tank 8. Therefore, heat is exchanged between the compressed air in the air pipe 14 and the heat medium in the heat-medium pipe 24, thereby recovering the compression heat, generated in the compression by the compressors 6, in the heat medium. That is, in the first heat exchangers 16, the temperature of the compressed air is decreased, while the temperature of the heat medium is increased. Here, the heat medium having its temperature increased is supplied to the heat medium tanks 18 (the first high-temperature heat medium tank 19 and the second high-temperature heat medium tank 20) through the heat-medium pipes 24.

The heat-medium pipes 24 from the first heat exchangers 16 to the heat medium tanks 18 (the first high-temperature heat medium tank 19 and the second high-temperature heat medium tank 20) are provided with temperature sensors 29a to 29c for measuring the respective temperatures of heat media which have their temperature increased by exchanging heat in the first heat exchangers 16.

The heat medium tanks 18 include the first high-temperature heat medium tank 19, the second high-temperature heat medium tank 20, and the low-temperature heat medium tank 21. In each of the heat medium tanks 19, 20, and 21, a remaining-amount sensor (not shown) is installed to enable detection of the amount of heat medium stored in the tank. For example, the remaining-amount sensor may be a gravimetric sensor or the like. The first high-temperature heat medium tank 19 and the second high-temperature heat medium tank 20 individually store therein the heat media having their temperatures increased in the first heat exchangers 16, depending on the temperatures of the heat media. The first high-temperature heat medium tank 19 stores the heat medium with a higher temperature, while the second high-temperature heat medium tank 20 stores the heat medium with a lower temperature than that of the heat medium in the first high-temperature heat medium tank 19. The first high-temperature heat medium tank 19 and the second high-temperature heat medium tank 20 are provided with temperature sensors 29d and 29e, respectively, to enable measurement of the temperature of the heat medium in each tank. The heat-medium pipes 24 (the high-temperature heat storage switching lines 24a) from the first heat exchangers 16 to the first high-temperature heat medium tank 19 and to the second high-temperature heat medium tank 20 are provided with high-temperature heat storage switching valves 31a and 31b. The high-temperature heat storage switching valves 31a and 31b are to switch the tank for storing the heat medium through the high-temperature heat storage switching line 24a to either the first high-temperature heat medium tank 19 or the second high-temperature heat medium tank 20. The heat media stored in the first high-temperature heat medium tank 19 and the second high-temperature heat medium tank 20 are supplied to the second heat exchangers 22 through the heat-medium pipes 24.

The heat-medium pipes 24 extending from the first high-temperature heat medium tank 19 and the second high-temperature heat medium tank 20 to the second heat exchangers 22 are provided with heat exchange switching valves 32a to 32f. The heat exchange switching valves 32a to 32f are to switch the tank from which the heat medium is supplied to the second heat exchanger 22 to either the first high-temperature heat medium tank 19 or the second high-temperature heat medium tank 20.

In this way, the compressed air energy storage power generation device includes the first high-temperature heat medium tank 19 and the second high-temperature heat medium tank 20, thereby making it possible to prevent the high-temperature heat medium from mixing with the low-temperature heat medium. Specifically, the high-temperature heat storage switching valves 31a and 31b are switched based on the temperature of the heat medium having the temperature thereof increased in each first heat exchanger 16. Because of this, the heat media are individually stored in the first high-temperature heat medium tank 19 and the second high-temperature heat medium tank 20, depending on their temperatures, so that the temperature of the heat medium, especially stored in the first high-temperature heat medium tank 19 can be maintained. In the present embodiment, the total number of the high-temperature heat medium tanks 19 and 20 is two, but is not limited thereto and may be three or more.

Each of the second heat exchangers 22 is provided in the air pipe 14 between the pressure accumulator tank 8 and the corresponding expander 10. Further, another second heat exchanger 22 is provided between each of the first-stage expander main bodies 11 and each of the second-stage expander main bodies 12. Therefore, heat exchange is performed between the heat medium in the heat-medium pipe 24 and each of the compressed air supplied from the pressure accumulator tank 8 to the first-stage expander main body 11 and the compressed air located between the first-stage expander main body 11 and the second-stage expander main body 12, whereby the compressed air is heated before being expanded by the expanders 10. That is, in the second heat exchangers 22, the temperature of the compressed air is increased, while the temperature of each of the heat media is decreased. Here, the heat medium having its temperature decreased is supplied to the low-temperature heat medium tank 21 through the heat-medium pipe 24.

Figure 2A:
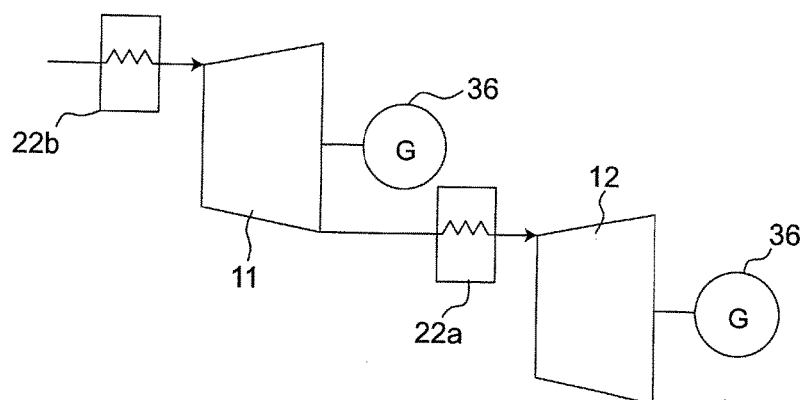
FIG. 2A is a diagram showing an installation pattern of second heat exchangers in the embodiment.
Figure 2B:
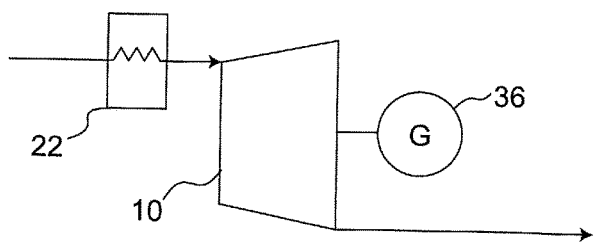
FIG. 2B is a diagram showing an alternative of the installation pattern of the second heat exchanger.
Figure 2C:
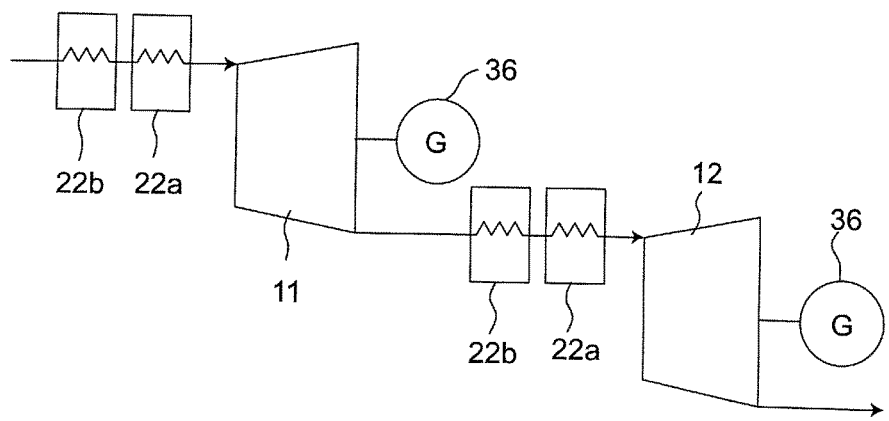
FIG. 2C is a diagram showing another alternative of the installation pattern of the second heat exchangers.

The second heat exchangers 22 can be proposed to be installed by various installation methods, in addition to the installing method of the present embodiment. FIGS. 2A to 2C illustrate installation examples of the second heat exchangers 22. FIG. 2A shows a case in which each second heat exchanger 22 is connected fluidically to each of the first-stage expander main body 11 and the second-stage expander main body 12 in the two-stage type expander 10, like the present embodiment. FIG. 2B shows a case in which one second heat exchanger 22 is connected fluidically to a single-stage type expander 10, unlike the present embodiment. FIG. 2C shows a case in which two second heat exchangers 22 are connected in series fluidically to each of the first-stage expander main body 11 and the second-stage expander main body 12 in the two-stage type expander 10. In addition, three or more second heat exchangers 22 may be connected in series fluidically.

Figure 3:
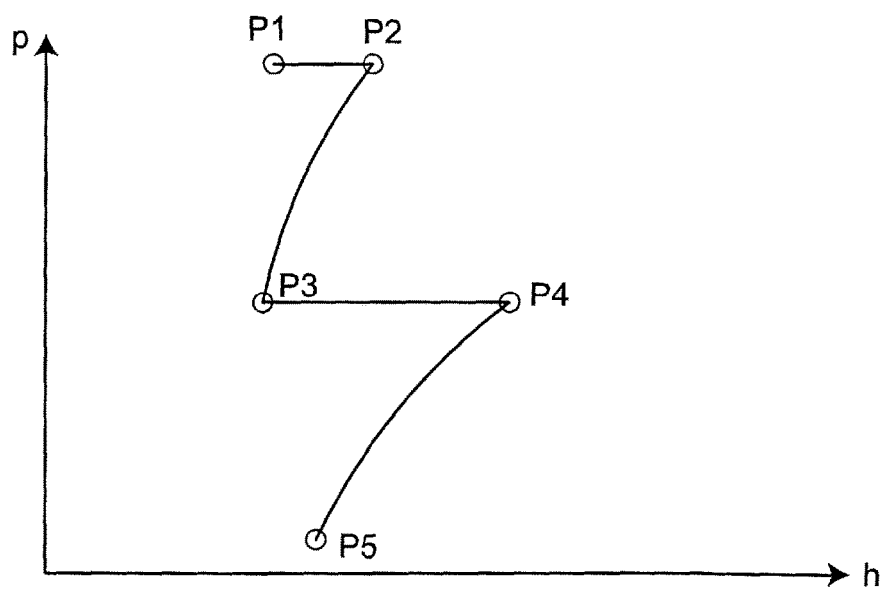
FIG. 3 is a p-h diagram showing the relationship between the pressure and enthalpy in a multistage expansion together with heating.

FIG. 3 is a p-h diagram of the two-stage type expander. The vertical axis indicates pressure, while the horizontal axis indicates specific enthalpy. In the diagram, a process from state P1 to state P2 represents a heating process in the second heat exchanger 22, and a process from state P2 to state P3 represents an expansion work process in the first-stage expander main body 11. Further, a process from state P3 to state P4 represents a heating process in the second heat exchanger 22, and a process from state P4 to state P5 represents an expansion work process in the second-stage expander main body 12. FIG. 3 shows an isentropic change, provided that the process from state P2 to state P3 and the process from state P4 to state P5 are adiabatic processes. By comparison between the expansion work processes in the first-stage expander main body 11 and the second-stage expander main body 12 (see FIGS. 2A and 2C), a gradient of the isentropic curve from state P4 to state P5 is smaller than a gradient of the isentropic curve from state P2 to state P3, which means that the amount of work performed on an outer side is larger. Therefore, in the case shown in FIG. 3, the heating amount from state P3 to state P4 is preferably set larger than the heating amount from state P1 to state P2 in terms of the efficiency of the system.

The low-temperature heat medium tank 21 mainly stores the heat medium having its temperature decreased by exchanging heat in the second heat exchangers 22. Thus, the temperature of the heat medium in the low-temperature heat medium tank 21 is usually lower than the temperature of the heat medium in each of the first high-temperature heat medium tank 19 and the second high-temperature heat medium tank 20. The heat medium stored in the low-temperature heat medium tank 21 is supplied to the first heat exchangers 16 through the heat-medium pipes 24.

The heat medium circulates through the heat medium path by a pump 38 installed in the heat-medium pipe 24 on the downstream side of the low-temperature heat medium tank 21. A flow-rate sensor 28e is provided on the downstream side of the pump 38 and thereby can detect an increase and a decrease in the flow rate of the pump 38. Note that the position of the pump 38 is not limited thereto and may be arranged at an arbitrary position in the heat medium path.

Further, in the CAES power generation device 2 of the present embodiment, the first heat exchangers 16 and the second heat exchangers 22 are connected together fluidically via the high-temperature heat medium tanks 19 and 20, and additionally, also connected together fluidically without involvement of the high-temperature heat medium tanks 19 and 20. For this reason, direct inflow switching valves 33a and 33b are provided in the heat-medium pipes 24 (the direct inflow switching lines 24b) on the upstream side with respect to the second heat exchangers 22 and the high-temperature heat medium tanks 19 and 20. The direct inflow switching valves 33a and 33b serve to switch the heat medium supplied from the first heat exchanger 16 to the second heat exchanger 22, between a state of flowing through the high-temperature heat medium tanks 19 and 20 and a state of flowing without involvement of the high-temperature heat medium tanks 19 and 20. Furthermore, a flow-rate sensor 28d is provided in the direct inflow switching line 24b that allows the heat medium to flow from the first heat exchangers 16 directly to the second heat exchangers 22.

In the CAES power generation device 2 of the present embodiment, the first high-temperature heat medium tank 19 and the low-temperature heat medium tank 21 are connected together fluidically by a heat-medium intertank line 24c. Likewise, the second high-temperature heat medium tank 20 and the low-temperature heat medium tank 21 are connected together fluidically by another heat-medium intertank line 24c. In these heat-medium intertank lines 24c, intertank shut-off valves 34 are provided. During the normal operation, each intertank shut-off valve 34 blocks the transfer of the heat medium between these tanks. In contrast, at start-up of the CAES power generation device 2 to be mentioned later, the interbank shut-off valve 34 is opened, enabling the transfer of the heat medium in some cases. Likewise, the transfer of the heat medium is possible even between the first high-temperature heat medium tank 19 and the second high-temperature heat medium tank 20 in some cases.

In the CAES power generation device 2 of the present embodiment, the first heat exchangers 16 are fluidically connected to the low-temperature heat medium tank 21 so that the heat medium can be supplied from the first heat exchangers 16 to the low-temperature heat medium tank 21. For this reason, low-temperature heat medium switching valves 35a to 35f serve to switch the supply of the heat medium to either of the high-temperature heat medium tanks 19 and 20 or the low-temperature heat medium tank 21. The low-temperature heat medium switching valves 35a to 35f are provided in the heat-medium pipes 24 on the downstream side of the first heat exchangers 16.

As mentioned above, the heat medium path in the CAES power generation device 2 is structured.

Furthermore, the CAES power generation device 2 includes a control unit 40. The control unit 40 is structured by hardware, including storage devices, such as a Central Processing Unit (CPU), a Random Access Memory (RAM), and a Read Only Memory (ROM), and software installed on the hardware. The control unit 40 is electrically connected to at least the individual valves 30a to 35f. The operations of the individual valves 30a to 35f are controlled by the control unit 40. The flow-rate sensors 28a to 28e, the temperature sensors 29a to 29e, and the remaining-amount sensors (not shown) of the heat medium tanks 18 output measured values to the control unit 40. The control unit 40 controls the CAES power generation device 2 based on these measured values.

Next, a control method for the CAES power generation device 2 will be described.

The CAES power generation device 2 in the present embodiment has two control methods, namely, simultaneous charging and discharging, which involves simultaneously performing storing (charging) of the compressed air and power generation (discharging) using the compressed air, and separate charging and discharging, which involves separately performing charging and discharging. Here, the term charging means the storing of the compressed air in the pressure accumulator tank 8, and the term discharging means the power generation by the power generator 36 using the compressed air in the pressure accumulator tank 8. The simultaneous charging and discharging is often used when the power generated by using the renewable energy varies in a short-term cycle. The separate charging and discharging is often used when the power generated by using the renewable energy varies in a long-term cycle. There is no clear definition to distinguish between the long-term cycle and the short-term cycle, but variations in the long-term cycle are those over a period of time from several hours to several days. In contrast, variations in the short-term cycle are those over a period of time from several minutes to less than one hour. Specifically, for example, in power generation using solar light, a factor for variations of the output in the long-term cycle is a day-night difference. A factor for variations of the output in the short-term cycle is that the sunlight is temporarily blocked by clouds. Meanwhile, in power generation using wind force, variations of the output in the long-term cycle occur when the power generation is stopped due to strong wind or no wind, while variations of the output in the short-term cycle occur when the wind speed varies.

Referring to FIG. 4, when the operation is started (step S4-1), the control method is determined depending on whether charging and discharging are performed simultaneously (step S4-2). This determination may be selected by the user according to the application or may be made depending on whether the renewable energy varies in the long-term cycle or the short-term cycle. In the case of the simultaneous charging and discharging (step S4-2), if the amount of demand power is larger than a power generation amount, and the whole amount of the heat media in the high-temperature heat medium tanks 19 and 20 are needed (step S4-3), processing A is performed (step S4-4). If not (step S4-3), a necessary amount of heat medium and an excess amount of heat medium are separated from each other (step S4-5). Then, the process A is performed on the necessary amount of heat medium (step S4-4), and processing B is performed on the excess amount of heat medium (step S4-6). The necessary amount of heat medium represents an amount of heat medium that enables the power generator 36 to generate the amount of demand power required by the electric power system 4. The heat medium is separated based on the measured value of the flow-rate sensor 28d. The separation is performed by switching the direct inflow switching valves 33a and 33b in the processing A and B, as will be mentioned later. After completion of these processing, the operation returns to step S4-2 again, and the procedure is repeated.

Referring to FIG. 5, when the processing A is started (step S5-1), the direct inflow switching valves 33a and 33b are switched (step S5-2), specifically, the direct inflow switching valve 33a is opened and the direct inflow switching valve 33b is closed, whereby the heat medium is directly supplied from the first heat exchangers 16 to the second heat exchangers 22 through the heat-medium pipes 24 (step S5-3). Then, heat exchange is performed between the compressed air and the heat medium in each of the second heat exchangers 22 (step S5-4). The heat medium having its temperature decreased by the heat exchange in the second heat exchanger 22 is supplied to and stored in the low-temperature heat medium tank 21 through the heat-medium pipe 24 (step S5-5). Finally, the processing A is finished (step S5-6).

Thus, the heat medium can be directly supplied from the first heat exchangers 16 to the second heat exchangers 22 without involvement of the high-temperature heat medium tanks 19 and 20, thereby making it possible to prevent the loss of heat energy due to a decrease in the temperature of the heat medium while the heat medium is stored in each of the high-temperature heat medium tanks 19 and 20. In particular, such direct supply of the heat medium is effective because, when variations in the renewable energy in the short-term cycle of less than approximately one hour are intended to be leveled out, the compressor and the expander are simultaneously driven in many cases, and in these cases the usage standby time of the heat medium is short or zero. Further, the switching between the direct inflow switching valves can supply the heat medium from the first heat exchangers directly to the second heat exchangers. Because of this, a device which is of the same type as a conventional device can be used, which eliminates the need for significant modification of the device, thereby making it possible to prevent a cost increase and an increase in size of the device. The term "direct" as used herein means the supply of the heat medium from the first heat exchangers 16 to the second heat exchangers 22 without involvement of the high-temperature heat medium tanks 19 and 20.

Referring to FIG. 6, when the processing B is started (step S6-1), if a temperature T1 of the heat medium, which is heat-exchanged in the first heat exchanger 16, is lower than a heat medium temperature Th1 in the first high-temperature heat medium tank 19 (step S6-2) and further is lower than a heat medium temperature Th2 in the second high-temperature heat medium tank 20 (step S6-3), then the low-temperature heat medium switching valves 35a to 35f are switched (step S6-4). Specifically, the low-temperature heat medium switching valves 35a to 35c are closed, and the low-temperature heat medium switching valves 35d to 35f are opened, whereby the heat medium, heat-exchanged in the first heat exchanger 16, is supplied to and stored in the low-temperature heat medium tank 21 (step S6-5). Meanwhile, if the temperature T1 of the heat medium, heat-exchanged in the first heat exchanger 16, is lower than the heat medium temperature Th1 in the first high-temperature heat medium tank 19 (step S6-2) and further is equal to or higher than the heat medium temperature Th2 in the second high-temperature heat medium tank 20 (step S6-3), then the high-temperature heat storage switching valves 31a and 31b are switched (step S6-6). Specifically, the high-temperature heat storage switching valve 31b is opened, and the high-temperature heat storage switching valve 31a is closed, whereby the heat medium heat-exchanged in the first heat exchanger 16 is supplied to and stored in the second high-temperature heat medium tank 20 (step S6-7). If the temperature T1 of the heat medium, heat-exchanged in the first heat exchanger 16, is equal to or higher than the heat medium temperature Th1 in the first high-temperature heat medium tank 19, the high-temperature heat storage switching valves 31a and 31b are switched (in step S6-8). Specifically, the high-temperature heat storage switching valve 31a is opened, and the high-temperature heat storage switching valve 31b is closed, whereby the heat medium heat-exchanged in the first heat exchanger 16 is supplied to and stored in the first high-temperature heat medium tank 19 (in step S6-8). The heat media individually stored in the first high-temperature heat medium tank 19 and the second high-temperature heat medium tank 20 are supplied to the second heat exchangers 22 through the heat-medium pipes 24. At this time, if the plurality of second heat exchangers is provided with respect to the expanders 10 (step S6-10), processing II is performed (step S6-11). If not (step S6-10), processing I is performed (step S6-12). After completion of such processing, the processing B is finished (step S6-13).

In this way, the use of the low-temperature heat medium switching valves 35a to 35f prevents the mixing of the high-temperature heat medium and the low-temperature heat medium. Specifically, the heat medium supplied from the first heat exchangers 16 to the high-temperature heat medium tanks 19 and 20 never decreases the temperature of the heat media having the heat stored in the high-temperature heat medium tanks 19 and 20, thereby making it possible to prevent the loss of the heat energy. Further, the use of the high-temperature heat storage switching valves 31a and 31b can individually store the heat medium in the first high-temperature heat medium tank 19 or the second high-temperature heat medium tank 20 depending on the temperature of the heat medium.

Referring to FIG. 7, the processing I is performed when only one second heat exchanger 22 is installed with respect to each expander 10 (see FIG. 2B). When the processing I is started (step S7-1), if the amount of demand power is larger than a power generation amount, and the whole amounts of the heat media in the high-temperature heat medium tanks 19 and 20 are needed (step S7-2), the heat exchange switching valves 32a to 32f are switched (step S7-3), thereby supplying the heat media in the first high-temperature heat medium tank 19 and the second high-temperature heat medium tank 20 to the second heat exchangers 22 (step S7-4). Subsequently, heat exchange is performed in the second heat exchangers 22 (step S7-5). If not (step S7-2), and if the second high-temperature heat medium tank 20 is empty (step S7-6), the heat exchange switching valves 32a to 32f are switched (step S7-7), thereby supplying the heat medium in the first high-temperature heat medium tank 19 to the second heat exchangers 22 (step S7-8). Subsequently, heat exchange is performed in the second heat exchangers 22 (step S7-9). Meanwhile, if the second high-temperature heat medium tank 20 is not empty (step S7-6), the heat exchange switching valves 32a to 32f are switched (step S7-10), thereby supplying the heat medium in the second high-temperature heat medium tank 20 to the second heat exchangers 22 (step S7-11). Subsequently, heat exchange is performed in the second heat exchangers 22 (step S7-12). Thereafter, the heat exchange switching valves 32a to 32f are switched (step S7-13), thereby supplying the heat medium in the first high-temperature heat medium tank 19 to the second heat exchangers 22 (step S7-14). Subsequently, heat exchange is performed in the second heat exchangers 22 (step S7-15). In either case, the heat medium having its temperature decreased by heat exchange in each second heat exchanger 22 is stored in the low-temperature heat medium tank 21 (step S7-6). Finally, the processing I is finished (step S7-17).

Referring to FIG. 8, when the processing II is started (step S8-1), if a plurality of the second heat exchangers is installed in series (step S8-2), processing II-2 is executed (step S8-3). If not (step S8-2), processing II-1 is executed (step S8-4). After completion of such processing, the processing II is finished (step S8-5).

Referring to FIG. 9, the processing II-1 is performed when one second heat exchanger 22 is installed for each of the first-stage expander main body 11 and the second-stage expander main body 12 (see FIG. 2A). When the processing II-1 is started (step S9-1), the heat exchange switching valves 32a to 32f are switched (step S9-2). The heat medium in the first high-temperature heat medium tank 19 is supplied to the high-temperature side second heat exchanger 22a installed for the expander 10 corresponding to an isentropic curve with a smaller gradient (see FIG. 3), while the heat medium in the second high-temperature heat medium tank 20 is supplied to the low-temperature side second heat exchanger 22b installed for the other expander 10 corresponding to an isentropic curve with a larger gradient (see FIG. 3) (step S9-3). Subsequently, heat exchange is performed in each of the high-temperature side second heat exchanger 22a and the low-temperature side second heat exchanger 22b (step S9-4). The heat media, heat-exchanged in the high-temperature side second heat exchanger 22a and the low-temperature side second heat exchanger 22b, are supplied to and stored in the low-temperature heat medium tank 21 through the heat-medium pipe 24 (step S9-5). Finally, the processing II-1 is finished (step S9-6).

In this way, the high-temperature heat medium is supplied to the second heat exchanger 22 which is installed for one of the first-stage expander main body 11 and the second-stage expander main body 12, corresponding to the isentropic curve with the smaller gradient, so that the power generation can be efficiently performed. This is because the expander main body corresponding to the isentropic curve with the smaller gradient undergoes a significant decrease in the enthalpy relative to the same decrease in the pressure, and thereby more heat energy needs to be supplied to such an expander main body.

Referring to FIG. 10, the processing II-2 is performed when two second heat exchangers 22 are installed in series for each of the first-stage expander main body 11 and the second-stage expander main body 12 (see FIG. 2C). When the processing II-2 is started (step S10-1), the heat exchange switching valves 32a to 32f are switched (step S10-2). The heat medium in the second high-temperature heat medium tank 20 is supplied to the low-temperature side second heat exchanger 22b located on the upstream side, while the heat medium in the first high-temperature heat medium tank 19 is supplied to the high-temperature side second heat exchanger 22a located on the downstream side (step S10-3). Subsequently, heat exchange is performed in the low-temperature side second heat exchanger 22b (step S10-4), and then heat exchange is performed in the high-temperature side second heat exchanger 22a (step S10-5). The heat medium having its temperature decreased by the heat exchange in the high-temperature side second heat exchanger 22a and the low-temperature side second heat exchanger 22b is supplied to and stored in the low-temperature heat medium tank 21 (step S10-6). Finally, the processing II-2 is finished (step S10-7).

In this way, through the second heat exchangers 22, the compressed air exchanges heat with the low-temperature heat medium and the high-temperature heat medium in this order, so that the temperature of the compressed air can be increased in sequence without being decreased. Thus, the heat medium at a high temperature can be effectively utilized. Even when three or more second heat exchangers 22 are connected in series fluidically, the compressed air only needs to be heat-exchanged with the low-temperature heat medium and the high-temperature heat medium in this order in the same manner.

Furthermore, the CAES power generation device 2 in the present embodiment performs optimal control at start-up.

Referring to FIG. 11, when the CAES power generation device 2 is started up (step S11-1), if a temperature T1 of the heat medium, which is heat-exchanged in the first heat exchanger 16, is higher than a heat medium temperature Th1 in the first high-temperature heat medium tank 19 (step S11-2), then the intertank shut-off valve 34 is opened (step S11-3), and the heat medium in the first high-temperature heat medium tank 19 is moved to the low-temperature heat medium tank 21 (step S11-4). Subsequently, the heat medium in the first high-temperature heat medium tank 19 is made empty (step S11-5), and the intertank shut-off valve 34 is closed (step S11-6). Then, the high-temperature heat storage switching valves 31a and 31b are switched (step S11-7). Specifically, the high-temperature heat storage switching valve 31a is opened, and the high-temperature heat storage switching valve 31b is closed, whereby the heat medium heat-exchanged in the first heat exchanger 16 is supplied to and stored in the first high-temperature heat medium tank 19 (step S11-8). Meanwhile, if the temperature T1 of the heat medium, heat-exchanged in the first heat exchanger 16, is equal to or lower than the heat medium temperature Th1 in the first high-temperature heat medium tank 19 (step S11-2) and if temperature T1 of the heat medium, heat-exchanged in the first heat exchanger 16, is higher than the heat medium temperature Th2 in the second high-temperature heat medium tank 20 (step S11-9), the high-temperature heat storage switching valves 31a and 31b are switched (step S11-10). Specifically, the high-temperature heat storage switching valve 31b is opened, and the high-temperature heat storage switching valve 31a is closed, whereby the heat medium heat-exchanged in the first heat exchanger 16 is supplied to and stored in the second high-temperature heat medium tank 20 (step S11-11). If a temperature T1 of the heat medium, which is heat-exchanged in the first heat exchanger 16, is equal to or lower than a heat medium temperature Th2 in the second high-temperature heat medium tank 20 (step S11-9), then the low-temperature heat medium switching valves 35a to 35f are switched (step S11-12). Specifically, the low-temperature heat medium switching valves 35a to 35c are closed, and the low-temperature heat medium switching valves 35d to 35f are opened, whereby the heat medium, heat-exchanged in each first heat exchanger 16, is supplied to and stored in the low-temperature heat medium tank 21 (step S11-13). Then, the operation proceeds to the normal operation (step S11-14).

With this structure, even when the compressed air energy storage power generation device has been left for a long time since start-up and become at ambient temperature as a whole in the presence of the low-temperature heat medium in the first high-temperature heat medium tank 19, the use of the intertank shut-off valve 34 can prevent the mixing of such a low-temperature heat medium with the high-temperature heat medium having the compression heat recovered therein. Further, the use of the high-temperature heat storage switching valves 31a and 31b can individually store the heat medium in the high-temperature heat medium tanks 19 and 20 depending on the temperature of the heat medium. Therefore, the temperatures of the heat media having the heat stored in the high-temperature heat medium tanks 19 and 20 are not decreased, thereby making it possible to prevent the loss of the heat energy. In the present embodiment, for the duration from step S11-2 to step S11-5 shown in FIG. 11, the heat medium in the first high-temperature heat medium tank 19 is moved to the low-temperature heat medium tank 21 under the predetermined conditions. However, the transfer of the heat medium is not limited thereto. That is, for example, the heat medium in the first high-temperature heat medium tank 19 may be moved to the second high-temperature heat medium tank 20 to make the first high-temperature heat medium tank 19 empty.

As mentioned above, the optimal control can be achieved during the normal operation and at start-up. During the normal operation, the compressed air energy storage power generation device takes the control methods for the simultaneous charging and discharging and the separate charging and discharging and thus can handle variations in the renewable energy in the short-term cycle and the long-term cycle.

The invention claimed is:

1. A compressed air energy storage power generation device, comprising:
   an electric motor driven with input electric power generated by using renewable energy;
   a compressor mechanically connected to the electric motor and configured to compress air;
   a pressure accumulator tank fluidically connected to the compressor and configured to store therein the compressed air by the compressor;
   an expander fluidically connected to the pressure accumulator tank and driven by the compressed air supplied from the pressure accumulator tank;
   a power generator mechanically connected to the expander and configured to generate electric power, which is to be supplied to a demander;
   a first heat exchanger that exchanges heat between the air compressed by the compressor and a heat medium to thereby heat the heat medium;
   a temperature sensor that measures a temperature of the heat medium, heat-exchanged in the first heat exchanger;
   a plurality of high-temperature heat medium tanks fluidically connected to the first heat exchanger, the plurality of high-temperature heat medium tanks being configured to individually store the heat medium having the temperature thereof increased by the heat exchange in the first heat exchanger, depending on the temperature of the heat medium;
   a high-temperature heat storage switching valve for switching the heat medium supplied from the first heat exchanger to any one of the plurality of high-temperature heat medium tanks;
   a second heat exchanger fluidically connected to the plurality of high-temperature heat medium tanks, the second heat exchanger being configured to exchange heat between the heat medium supplied from each of the plurality of high-temperature heat medium tanks and the compressed air supplied to the expander to thereby heat the compressed air;
   a low-temperature heat medium tank fluidically connected to the first heat exchanger and the second heat exchanger, the low-temperature heat medium tank being configured to store the heat medium having the temperature thereof decreased by the heat exchange in the second heat exchanger; and
   a control unit electrically connected to the temperature sensor and the high-temperature heat storage switching valve, the control unit being configured to switch the high-temperature heat storage switching valve to supply the heat medium from the first heat exchanger to any one of the plurality of high-temperature heat medium tanks, in order to individually store the heat medium in the corresponding high-temperature heat medium tank based on a temperature of the heat medium measured by the temperature sensor, depending on the temperature of the heat medium from the first heat exchanger.

2. The compressed air energy storage power generation device according to claim 1, wherein the first heat exchanger is fluidically connected to the high-temperature heat medium tanks and the second heat exchanger, the compressed air energy storage power generation device further comprising:
   a direct inflow switching valve electrically connected to the control unit, the direct inflow switching valve being configured to switch the heat medium supplied from the first heat exchanger to either the high-temperature heat medium tank or the second heat exchanger, wherein
   the control unit directly supplies the heat medium from the first heat exchanger to the second heat exchanger by switching the direct inflow switching valve when simultaneously performing compression by the compressor and expansion by the expander.

3. The compressed air energy storage power generation device according to claim 1, wherein the second heat exchanger is one of a plurality of second heat exchangers in the compressed air energy storage power generation device, the plurality of second heat exchangers being fluidically connected in series with respect to the expander, the compressed air energy storage power generation device further comprising:
   a heat exchange switching valve for switching the heat medium supplied from the high-temperature heat medium tank to any one of the second heat exchangers, wherein the control unit switches the heat exchange switching valve to supply each of the heat media, individually stored in the respective high-temperature heat medium tanks depending on the temperature of the heat medium, to each of the second heat exchangers from an upstream side in ascending order of the temperature of the heat medium.

4. The compressed air energy storage power generation device according to claim 1, further comprising:
a heat exchange switching valve for switching the heat medium supplied from the high-temperature heat medium tank to any one of the second heat exchangers, wherein
the expander comprises a first-stage expander main body and a second-stage expander main body, and
the control unit switches the heat exchange switching valve to supply a higher-temperature heat medium among the heat media, individually stored in the respective high-temperature heat medium tanks depending on the temperature of the heat medium, to the second heat exchanger fluidically connected to one of the first-stage expander main body and the second-stage expander main body that corresponds to an isentropic curve with a smaller gradient in a p-h diagram.

5. The compressed air energy storage power generation device according to claim 1, further comprising:
a low-temperature heat medium switching valve configured to switch the heat medium supplied from the first heat exchanger to either the high-temperature heat medium tank or the low-temperature heat medium tank, wherein
the control unit is electrically connected to the temperature sensor and the low-temperature heat medium switching valve, the control unit being configured to switch the low-temperature heat medium switching valve to supply the heat medium to the low-temperature heat medium tank when a temperature of the heat medium with compression heat recovered therein in the first heat exchanger, measured by the temperature sensor, is equal to or lower than a predetermined temperature.

6. A compressed air energy storage power generation device, comprising:
an electric motor driven with input electric power generated by using renewable energy;
a compressor mechanically connected to the electric motor and configured to compress air;
a pressure accumulator tank fluidically connected to the compressor and configured to store therein the compressed air by the compressor;
an expander fluidically connected to the pressure accumulator tank and driven by the compressed air supplied from the pressure accumulator tank;
a power generator mechanically connected to the expander and configured to generate electric power, which is to be supplied to a demander;
a first heat exchanger that exchanges heat between the air compressed by the compressor and a heat medium to thereby heat the heat medium;
a temperature sensor that measures a temperature of the heat medium, heat-exchanged in the first heat exchanger;
a high-temperature heat medium tank fluidically connected to the first heat exchanger and adapted to store the heat medium having a temperature thereof increased in the first heat exchanger;
a second heat exchanger fluidically connected to the high-temperature heat medium tank, the second heat exchanger being configured to exchange heat between the heat medium supplied from the high-temperature heat medium tank and the compressed air supplied to the expander to thereby heat the compressed air;
a low-temperature heat medium tank fluidically connected to the first heat exchanger and the second heat exchanger, the low-temperature heat medium tank being configured to store the heat medium having the temperature thereof decreased in the second heat exchanger;
a low-temperature heat medium switching valve configured to switch the heat medium supplied from the first heat exchanger, to either the high-temperature heat medium tank or the low-temperature heat medium tank; and
a control unit electrically connected to the temperature sensor and the low-temperature heat medium switching valve, the control unit being configured to switch the low-temperature heat medium switching valve to supply the heat medium to the low-temperature heat medium tank when a temperature of the heat medium with compression heat recovered therein in the first heat exchanger, measured by the temperature sensor, is equal to or lower than a predetermined temperature.

7. The compressed air energy storage power generation device according to claim 2, wherein the second heat exchanger is one of a plurality of second heat exchangers in the compressed air energy storage power generation device, the plurality of second heat exchangers being fluidically connected in series with respect to the expander, the compressed air energy storage power generation device further comprising:
a heat exchange switching valve for switching the heat medium supplied from the high-temperature heat medium tank to any one of the second heat exchangers, wherein
the control unit switches the heat exchange switching valve to supply each of the heat media, individually stored in the respective high-temperature heat medium tanks depending on the temperature of the heat medium, to each of the second heat exchangers from an upstream side in ascending order of the temperature of the heat medium.

8. The compressed air energy storage power generation device according to claim 2, further comprising:
a heat exchange switching valve for switching the heat medium supplied from the high-temperature heat medium tank to any one of the second heat exchangers, wherein
the expander comprises a first-stage expander main body and a second-stage expander main body, and
the control unit switches the heat exchange switching valve to supply a higher-temperature heat medium among the heat media, individually stored in the respective high-temperature heat medium tanks depending on the temperature of the heat medium, to the second heat exchanger fluidically connected to one of the first-stage expander main body and the second-stage expander main body that corresponds to an isentropic curve with a smaller gradient in a p-h diagram.

9. The compressed air energy storage power generation device according to claim 2, further comprising:
a low-temperature heat medium switching valve configured to switch the heat medium supplied from the first heat exchanger to either the high-temperature heat medium tank or the low-temperature heat medium tank, wherein the control unit is electrically connected to the temperature sensor and the low-temperature heat medium switching valve, the control unit being configured to switch the low-temperature heat medium switching valve to supply the heat medium to the low-temperature heat medium tank when a temperature of the heat medium with compression heat recovered therein in the first heat exchanger, measured by the temperature sensor, is equal to or lower than a predetermined temperature.

* * * * *